(No Model.)
E. H. A. OAKLEY.
NUT LOCK.
No. 381,573. Patented Apr. 24, 1888.
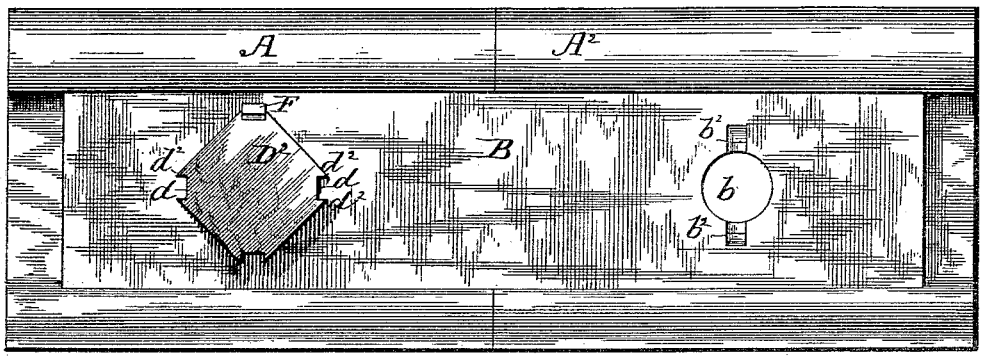
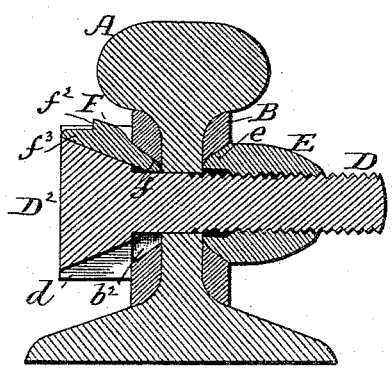
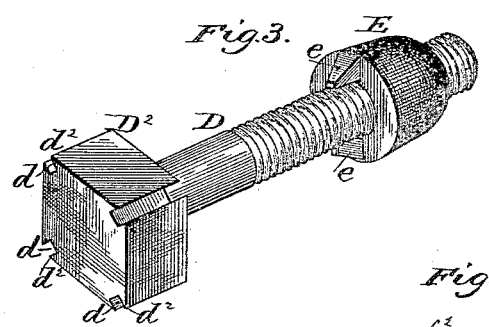
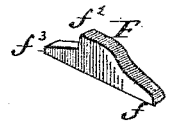
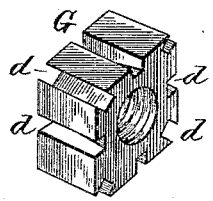
Witnesses:
E. C. Wurdeman
J. J. Masson
Inventor:
Edward H. A. Oakley
by E. E. Masson
atty.

UNITED STATES PATENT OFFICE.

EDWARD H. A. OAKLEY, OF AIKEN, SOUTH CAROLINA.

NUT-LOCK.

SPECIFICATION forming part of Letters Patent No. 381,573, dated April 24, 1888.

Application filed June 13, 1887. Serial No. 241,172. (No model.)

*To all whom it may concern:*

Be it known that I, EDWARD H. A. OAKLEY, a citizen of the United States, residing at Aiken, in the county of Aiken, State of South Carolina, have invented certain new and useful Improvements in Nut-Locks, of which the following is a specification, reference being had therein to the accompanying drawings.

My invention relates to improvements in locking devices for bolts and nuts; and the objects of my improvements are to devise a simple, inexpensive, and efficient lock for the same, which will prevent them from becoming loose, and which can be readily applied, and also removed with little trouble when desired, and is especially adapted for use to joints of railroad-rails, and for this purpose the head of the bolt or its nut has in the periphery thereof a series of grooves, and one or both of the fish-plates of said joints have also grooves to receive a tapering key to be placed and retained therein, as will be hereinafter described in connection with the accompanying drawings, in which—

Figure 1 is a side view of a railroad-joint provided with fish-plates and a nut-lock constructed in accordance with my invention. Fig. 2 is a transverse vertical section of the same. Fig. 3 is a perspective view of a bolt and nut constructed in accordance with my invention. Fig. 4 is a perspective view of the key. Fig. 5 is a perspective view of a nut adapted to receive said key.

In the drawings, A and $A^2$ represent the ends of railroad-rails, and B the fish-plates uniting them. The latter have, besides the usual perforations, $b$, to receive the bolts D, used to connect the fish-plates with the rails, other perforations or slots, $b^2$, radiating from the perforations $b$. Two of these slots are shown in this case, one being shown at the highest point of the perforations $b$ and the other at the lowest point; but the number of said slots may vary according to circumstances. To retain the bolt connected to the parts united thereby, I prefer a nut, E, that cannot be turned with an ordinary wrench, and for this purpose the outer face of said nut is semispherical; but to prevent it from accidentally turning upon the bolt its inner or flat face is provided with spurs $e$, adapted to enter the slots $b^2$ in one of the fish-plates. When the nut E is held in said position united to the fish-plate, and the bolt D is inserted through the fish-plate, the rail, and the nut E, said bolt is locked as follows: There is cut in the head $D^2$ of said bolt, preferably in each corner thereof, a groove, $d$, to receive the locking-key F. Said groove is shallow at the outer end thereof, but, preferably, deeper at its inner end, so that the key will require but a small slot, $b^2$, for the reception of its inner end, $f$, into the fish-plate. Its outer portion has a shoulder, $f^2$, against which a suitable tool may be forced to drive the key in its seat. The outer end, $f^3$, of the key is made thin, so that its surface will be below the surface or sides of the head when in position to lock the bolt. When thus inserted, it is retained against removal by hitting the corners $d^2$ of the groove a light blow or two with a hammer, and thus clinching its metal upon the end $f^3$ of the key; but when it is desired to unlock the bolt these clinched and upset portions of the nut can easily be straightened with a suitable tool.

The locking-key has been described above as in engagement with the head of the bolt; but it is evident that it could be used to lock a nut, as G, Fig. 5, having its sides provided with grooves $d$ of suitable size to receive said key.

Having now fully described my invention, I claim—

The combination of a rail, fish-plates having perforations to receive bolts, and radial slots leading from said perforations, with a nut and a bolt having a head provided with grooves in its periphery, and a key adapted to enter the radial slots in the fish-plate and the grooves in the head of the bolt, the head or outer end of said key being less in height than the edges of the groove, whereby said head is wholly embedded in said groove and adapted to be retained therein by upsetting said edges over the key, substantially as described.

In testimony whereof I affix my signature in presence of two witnesses.

EDWARD H. A. OAKLEY.

Witnesses:
J. T. WEATHERSBEE,
A. W. OAKLEY.